US00RE34509E

United States Patent [19]

Stahlecker

[11] E Patent Number: Re. 34,509

[45] Reissued Date of Patent: Jan. 18, 1994

[54] METHOD OF MAKING A BEARING FOR SPINDLES OF SPINNING OR TWISTING MACHINES

[75] Inventor: Hans Stahlecker, Haldenstrasse 20, 7334 Süssen, Fed. Rep. of Germany

[73] Assignees: Hans Stahlecker; Fritz Stahlecker, Fed. Rep. of Germany

[21] Appl. No.: 913,441

[22] Filed: Jul. 14, 1992

Related U.S. Patent Documents

Reissue of:
[64] Patent No.: ~~0,655,125~~ 4065512
Issued: Nov. 19, 1991
Appl. No.: 432,844
Filed: Nov. 7, 1989

U.S. Applications:
[63] Continuation of Ser. No. 365,716, Jun. 14, 1989, abandoned.

[30] Foreign Application Priority Data

Jun. 15, 1988 [DE] Fed. Rep. of Germany ..... 3820327

[51] Int. Cl.[5] ..... B23P 11/00; B21K 1/04

[52] U.S. Cl. ..... 29/898.09; 29/898.03; 29/898.07; 29/898.13; 29/DIG. 26

[58] Field of Search ..... 29/898.01, 898.03, 898.043, 29/898.044, 898.045, 898.046, 898.07, 898.09, 898.13, DIG. 26; 57/134, 135; 384/226–239, 610

[56] References Cited

U.S. PATENT DOCUMENTS

| | | | |
|---|---|---|---|
| 2,251,390 | 8/1941 | Beede | 384/230 |
| 2,704,946 | 3/1955 | Gray et al. | 384/231 X |
| 3,451,735 | 6/1969 | Stahlecker | 384/228 |
| 3,510,181 | 5/1970 | Stahlecker | 384/231 |
| 3,630,583 | 12/1971 | Stahlecker | 384/228 |
| 4,150,468 | 4/1979 | Hartbottle | 29/898.09 |

OTHER PUBLICATIONS

"Suessen WST Technical Information", 233e, May 1971, Spindelfabrik Suessen, W. Germany.

*Primary Examiner*—Mark Rosenbaum
*Assistant Examiner*—Peter Dungba Vo
*Attorney, Agent, or Firm*—Evenson, McKeown, Edwards & Lenahan

[57] ABSTRACT

In the case of a bearing for spindles of spinning or twisting machines, which contains a spindle bearing housing, a bolster, a centering tube, a pivot bearing and a step bearing sleeve, it is provided that a predetermined bearing play of the step bearing sleeve is adjusted to a desired dimension by maching the radial interior surface of the step bearing sleeve while the sleeve is already mounted in the centering tube.

12 Claims, 2 Drawing Sheets

METHOD OF MAKING A BEARING FOR SPINDLES OF SPINNING OR TWISTING MACHINES

Matter enclosed in heavy brackets [ ] appears in the original patent but forms no part of this reissue specification; matter printed in italics indicates the additions made by reissue.

BACKGROUND AND SUMMARY OF THE INVENTION

This is a continuation of application Ser. No. 365,716, filed June 14, 1989 now abandoned.

The invention relates to a bearing for spindles of spinning or twisting machines having a spindle bearing housing, which contains a bolster, a centering tube fastened to the spindle bearing housing in proximity of the bolster a pivot bearing and a step bearing sleeve, which is held by means of the centering tube and which has a predetermined bearing clearance with respect to a spindle shaft.

A bearing of the initially mentioned type is known from "Süssen/WST Technische Mitteilung" 233d 5,71. This bearing, which is relatively old and has proven itself in practice, was designed for relatively heavy spindles for correspondingly large packages, As a result of improvements of wind-up devices, which today establish yarn connections no longer by means of knots, but by means of yarn-like splicing points, much smaller packages or cops than produced earlier are produced today on ring spinning machines, which operate at higher rotational speeds of, for example, 25,000 $min^{-1}$ with a smaller stroke of approximately 200 mm and which work with ring diameters of 38 mm.

An object of the invention is to construct a bearing of the initially mentioned type such that it is adapted in an improved manner to the high rotational speed, the smaller stroke and the smaller ring diameter.

This object is achieved in that the distance between the bolster and the pivot bearing amounts to maximally 100 mm, and in that the bearing clearance of the step bearing sleeve is adjusted at the step bearing sleeve already mounted in the centering tube.

The invention is based on the recognition that it is important for an economical production of a smaller bearing and a smaller spindle that the step bearing play in the area of the step bearing sleeve can be established with sufficiently narrow tolerances in an economical manner. In the case of the known bearings, because of the relatively large distance between the pivot bearing and the bolster, a relatively large bearing play could be permitted in the area of the step bearing sleeve, without resulting in unacceptable values for the deflection of the spindle and of the package. However, when the distance is shortened between the bolster and the step bearing, it becomes necessary to reduce the bearing play in the area of the step bearing sleeve, which, however, for reasons of bearing technology, must not be excluded completely. The reduction of the step bearing play, as a result of the measures according to the invention, is however not connected with an increase in manufacturing costs because the step bearing play is established at the already mounted step bearing sleeve by means of machining, so that tolerances of the centering tube and mounting tolerances have no effect in this case. Therefore, a machining of the step bearing sleeve can be carried out with the same precision as previously, while bearing plays of 0.01 mm and less can still be maintained.

In a further embodiment of the invention, it is provided that the interior surface of the step bearing sleeve, which is already mounted in the centering tube, is brought to the predetermined measurement by machining. During this machining, for example, a machining by means of a friction tool, enlargements of the diameter of from 0.2 mm to approximately 0.5 mm may be carried out in order to obtain the desired bearing play.

In another embodiment of the invention, it is provided that the interior surface of the step bearing sleeve and the pertaining exterior surface of the shaft have a slightly conical shape, and that the step bearing sleeve is adjusted to the predetermined bearing play by means of an adjusting in axial direction. As a result, the desired bearing play can be achieved by means of the axial adjusting of the step bearing sleeve to the very low values.

In another embodiment of the invention, it is provided that the step bearing sleeve has a slightly conical exterior surface to which a correspondingly slightly conical interior surface of the centering tube is assigned, and that the step bearing sleeve is adjusted to the predetermined bearing play by means of the axial shifting with radial deformation. The slight bearing play can also be adjusted very precisely in this manner. In the two latter cases, it is expedient for the interior surfaces and the exterior surfaces to have a taper ration of approximately 1:50.

In a further embodiment of the invention, it is provided that the diameter for a spindle shaft, in the area of the bolster, amounts to maximally 7 mm. By means of this dimensioning, the required diameter for the roller bearing or its bearing seat is also limited so that the diameter of a wharve for a tangential belt drive, which normally is to be arranged in this area, can also be limited. This limiting of the drive wharve to a diameter that is as small as possible is expedient in view of the fact that no excessive belt speeds are required for the desired high rotational speeds of the spindle.

Other objects, advantages and novel features of the present invention will become apparent from the following detailed description of the invention when considered in conjunction with the accompanying drawings.

DETAILED DESCRIPTION OF THE DRAWINGS

Figure 1:
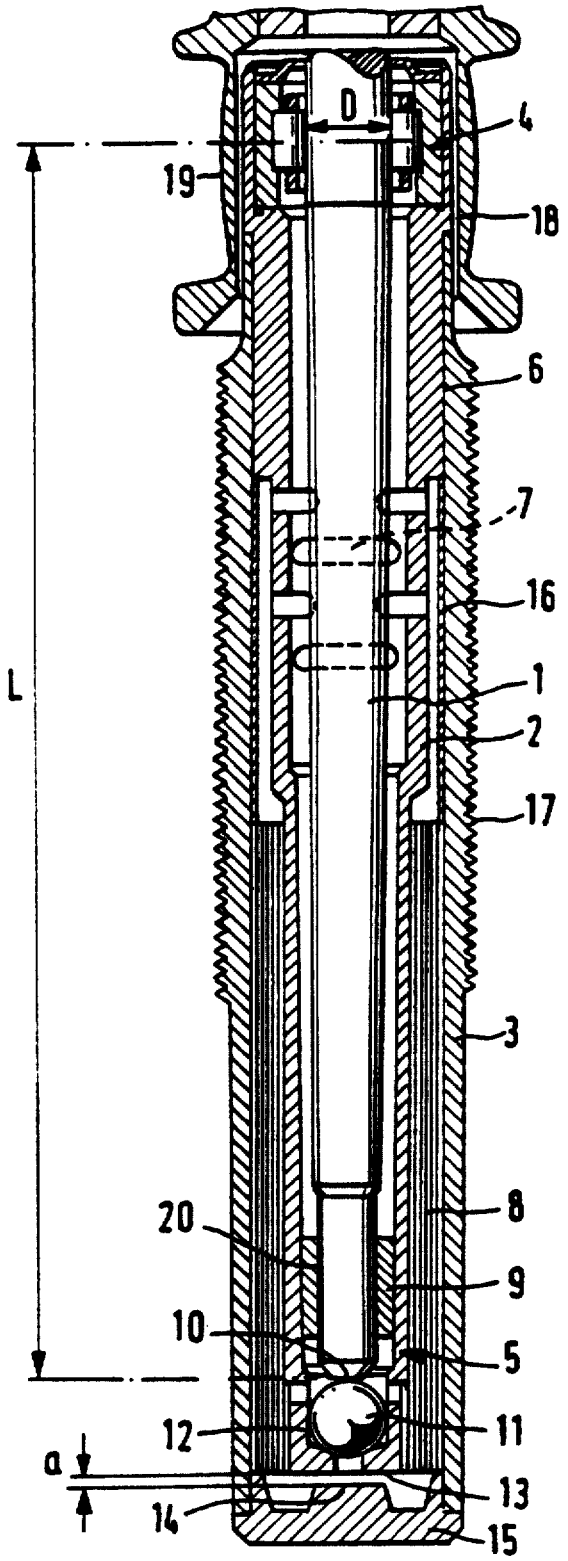
FIG. 1 is an axial sectional view of a bearing for a ring spindle constructed according to a preferred embodiment of the invention, enlarged to twice actual size.

In FIG. 1, only the shaft 1 of a ring spindle is shown, which is arranged vertically and which, in an upper area which is not shown, is constructed to accommodate a spinning package, i.e., a so-called spinning cop. The shaft 1, in the area which is not shown, is non-rotatably connected with a wharve 19 against which a belt moves which drives the whole spindle. In order to keep the belt speeds within acceptable limits, and nevertheless obtain rotational speeds of 25,000 $min^{-1}$, it is expedient to keep the diameter of the wharve 19 as small as possible. This wharve diameter is essentially dependent on the diameter (D) of the shaft 1 and the bolster 4 constructed as a roller bearing. In order to achieve the desired conditions, the spindle shaft 1 is constructed such that the diameter (D) is 7 mm or less.

Furthermore, in order to keep the masses to be rotated as small as possible, the spindle shaft 1 is also limited with respect to its length; i.e., the length (L) between the bolster 4 and a pivot bearing 11, constructed as a ball in the embodiment according to FIG. 1, is limited to maximally 100 mm.

The bearing contains a spindle bearing housing 3, which is equipped with an external thread 17 by means of which it can be fastened to a spindle rail. A centering tube 2 is held with a press fit 6 in the spindle bearing housing 3. This centering tube 2 forms a preassembled constructional unit with the bolster 4 and the step bearing 5. The step bearing 5 consists of the above-mentioned ball which is used as the pivot bearing 11 and which is inserted into a fit 12 of the centering tube 2. The end 10 of the shaft 1 supports itself in axial direction at the pivot bearing 11.

At an axial distance to the pivot bearing 11, a step bearing sleeve 9 is pressed into the centering tube 2 and has a cylindrical inside diameter which maintains a bearing play of form 0.008 to 0.01 mm with respect to the cylindrical end section of the shaft 1. The foot bearing sleeve 9, in the embodiment according to FIG. 1, had been pressed into the centering tube 2 before its inside diameter was expanded to its final measurement which determines the bearing play 20. This expanding of the bearing sleeve 9, which has already been mounted in the centering tube 2, takes place preferably by means of a friction tool.

In order to render the centering tube 2 more elastically bendable, it is provided in its upper area with notches 7 which are arranged to be offset with respect to one another. In addition, the centering tube 2 is surrounded by a damping spiral 8, which is known per se and which is held in its position by means of a spacing sleeve 16. The damping spiral 8 operates in an oil bath. The centering tube 2, in the area above the step bearing sleeve 9 and in the area of the end 10 of the shaft 1, is provided with cross-bores, so that an oil lubrication is also achieved in the area of the pivot bearing 11 and of the step bearing sleeve 9.

A bottom 15 is inserted into the spindle bearing housing 3, which is located with a stop surface 14 at a distance "a" of approximately one millimeter opposite the end 13 of the centering tube 2 which is bent toward the inside. In the case of above-average axial loads of the centering tube, the stop surface 14 therefore limits the axial movement.

Figure 2:
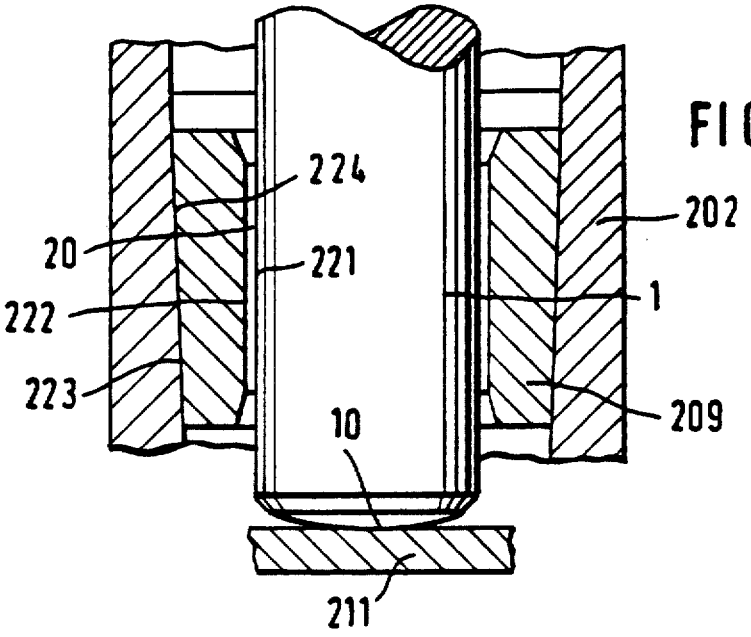
FIG. 2 is an again very enlarged partial sectional view of a modified embodiment of the invention.

In the embodiment according to FIG. 2, the bearing play 20 is shown in an exaggerated manner and should advantageously amount to between 0.008 mm and 0.01 mm. In this construction, it is provided that the end area of the shaft 1 is cylindrical and supports itself with a crowned end 10 at a pivot bearing 211 constructed as a plate. The step bearing sleeve 209 has a slightly conical outside diameter 224, to which a corresponding, slightly conical inside diameter 223 of the centering tube 202 is assigned. The taper ratio amounts to approximately 1:50. By means of an axial shifting of the step bearing sleeve 209 inserted in the press fit with an overlapping of approximately 0.02 mm, a deformation is obtained of the centering tube 202 by means of widening, as well as of the step bearing sleeve 209 by means of compressing. This compression of the step bearing sleeve 209 has the result that the bearing play 20 can be adjusted between the cylindrical exterior surface 221 of the shaft 1 and the cylindrical interior surface 222 of the step bearing sleeve 209. In this case, the adjusting advantageously takes place in such a manner that, for the adjusting of the step bearing sleeve 209, a preferably pneumatic measuring instrument is used which permits an exact measuring of the inside diameter.

Figure 3:
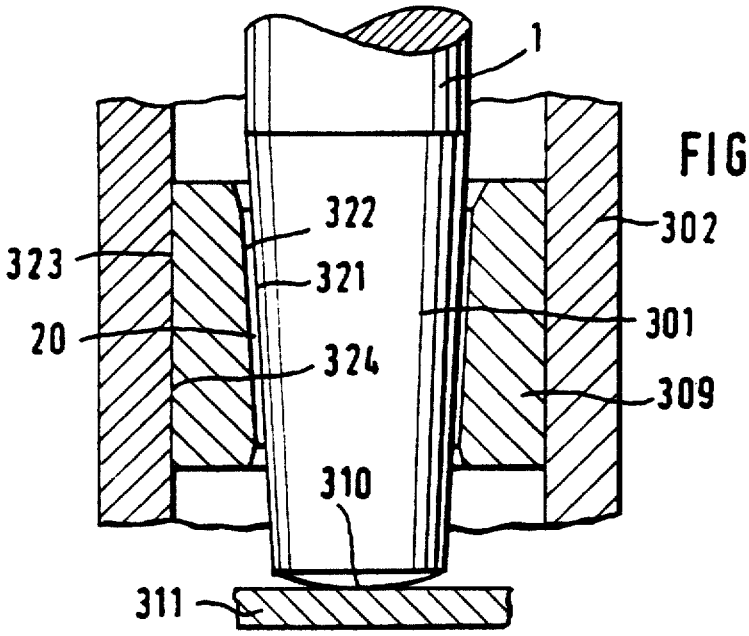
FIG. 3 is an also very enlarged partial sectional view of another embodiment of the invention.

In the embodiment according to FIG. 3, the exterior surface 321 of the end area 301 of the shaft 1 as well as the interior surface 322 of the step bearing sleeve 309, have a slightly conical shape, the taper ratio being also in the order of 1:50. The exterior surface 324 of the step bearing sleeve 309 and the interior surface 323 of the centering tube 302 are cylindrical. By means of the axial adjusting of the step bearing sleeve 309 arranged with a press fit in the centering tube 302, the bearing play 20 can be adjusted to a given value which depends on the axial position of the step bearing sleeve 309. The adjusting takes place by using a setting gauge or a corresponding measuring instrument.

As shown in the embodiments according to FIGS. 2 and 3, a plate is used as the step bearing 211, 311, on which a crowned end 10, 310 of the shaft 1 is supported. This plate is expediently supported by an additional supporting plate which is inserted into the centering tube 202, 302 which is open at the bottom. This plate may be held by a flanging of the lower edge.

As a modification of the embodiment according to FIG. 1, it is provided that the centering tube is produced from a piece of tube; i.e., that the centering tube will then have a smooth outside diameter. In this case, the bolster 4 is housed in a head bearing sleeve which, as in the embodiment according to FIG. 1, forms a bearing seat having an outside diameter which correspond to the outside diameter of the spindle bearing housing 3 and which, by means of a shoulder, projects into the spindle bearing housing 3 and is held there with a press fit corresponding to press fit 6. The centering tube 2, which will then have a smooth outer contour, will then be inserted into the head bearing sleeve and be connected with it by means of a press fit.

Also in this case, the outer ring of the bolster is supported in axial direction in a shoulder, similar to the embodiment according to FIG. 1, and is held by means of a flanging of the edge of the head bearing sleeve, in which case also—as in the embodiment according to FIG. 1—a sealing ring may be inserted.

Although the present invention has been described and illustrated in detail, it is to be clearly understood that the dame is by wa of illustration and example only, and is not to be taken by way of limitation. The spirit and scope of the present invention are to be limited only by the terms of the appended claims.

What is claimed:

1. A process for manufacturing a bearing for spindles of spinning of twisting machines, said bearing including a spindle bearing housing, a bolster contained in the spindle bearing housing and surrounding a bolster bearing for engagably supporting a spindle shaft at its circumference, a step pivot bearing for engagably supporting an end of a spindle shaft, a centering tube fastened to the spindle bearing housing in proximity to the bolster and including means for holding the step pivot bearing, said centering tube having interior surfaces, and a step bearing sleeve having interior and exterior surfaces, said sleeve is held in the centering tube and serving to radially locate a section of a spindle adjacent its end supported at the step pivot bearing, said process comprising:

mounting the step bearing sleeve in the centering tube, and subsequently adjusting radial step bearing play of the step bearing sleeve with respect to a spindle to be supported thereat while the step bearing sleeve is mounted in the centering tube by machining radially interior surfaces of the step bearing sleeve, whereby tolerance deviations at the centering tube and mounting tolerances for the step bearing sleeve at the centering tube do not adversely affect the step bearing play adjustment while permitting economical manufacture of the bearing.

2. The process according to claim 1, wherein the distance (L) between the bolster and the step pivot bearing is no more than 100 mm.

3. The process according to claim 1, wherein a taper ratio of approximately 1:50 is provided for the interior surfaces of the centering tube and the exterior surfaces of the step bearing sleeve.

4. The process according to claim 1, wherein the diameter (D) for the spindle shaft in the area of the bolster amounts to maximally 7 mm.

5. The process according to claim 1, wherein the centering tube is provided with a seat for a bearing outer ring of the bolster.

6. The process according to claim 1, further comprising holding said pivot bearing axially and radially in said centering tube.

7. The process according to claim 1, wherein the centering tube, in an area connected to the seat of the bolster, is provided with an increased wall thickness, which is held in the spindle bearing housing by press-fitting.

8. The process according to claim 7, wherein the bolster is housed in a head bearing sleeve which is connected with the centering tube by press-fitting and which, in turn, is held in the spindle bearing housing by press-fitting.

9. The process according to claim 8, wherein the centering tube is constructed as a preassembled constructional unit with the bolster, the pivot bearing and the step bearing sleeve.

10. The process according to claim 1, wherein the bolster is housed in a head bearing sleeve which is connected with the centering tube by means of a press fit and which, in turn, is held in the spindle bearing housing by press-fitting.

11. The process according to claim 1, wherein the centering tube is constructed as a preassembled constructional unit with the bolster, the pivot bearing and the step bearing sleeve.

12. The process according to claim 1, wherein the step bearing sleeve has a slightly conical exterior surface to which a corresponding slightly conical interior surface of the centering tube is assigned.

* * * * *